US010860467B2

(12) United States Patent
Hagendorf et al.

(10) Patent No.: US 10,860,467 B2
(45) Date of Patent: *Dec. 8, 2020

(54) METHOD OF CONFIGURING A TEST DEVICE DESIGNED TO TEST AN ELECTRONIC CONTROL UNIT, AND A CONFIGURATION SYSTEM

(71) Applicant: dSPACE digital signal processing and control engineering GmbH, Paderborn (DE)

(72) Inventors: Joerg Hagendorf, Paderborn (DE); Martin Kronmueller, Salzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,857

(22) Filed: Apr. 10, 2020

(65) Prior Publication Data

US 2020/0242018 A1    Jul. 30, 2020

Related U.S. Application Data

(62) Division of application No. 16/119,718, filed on Aug. 31, 2018, now Pat. No. 10,657,037.

(30) Foreign Application Priority Data

Aug. 31, 2017  (DE) .................. 10 2017 120 016

(51) Int. Cl.
*G06F 9/44*   (2018.01)
*G06F 11/36*  (2006.01)
*G06F 11/22*  (2006.01)

(52) U.S. Cl.
CPC .......... *G06F 11/3688* (2013.01); *G06F 11/22* (2013.01); *G06F 11/3664* (2013.01); *G06F 11/3684* (2013.01); *G06F 11/3692* (2013.01)

(58) Field of Classification Search
None
See application file for complete search history.

(56) References Cited

U.S. PATENT DOCUMENTS 7,594,220 B2 *  9/2009  Kodosky ............. G06F 3/04817
                                              715/740
8,954,920 B2 *  2/2015  Biglari .................... G06F 8/30
                                              717/100

(Continued)

FOREIGN PATENT DOCUMENTS

DE    10 2016 102 920 A1    8/2017

OTHER PUBLICATIONS

German Office Action dated Feb. 28, 2020 in corresponding application DE102017120016A1.

*Primary Examiner* — Anna C Deng
(74) *Attorney, Agent, or Firm* — Muncy, Geissler, Olds & Lowe, P.C.

(57) ABSTRACT

A configuration system for a test device designed for testing an electronic control unit. The test device is a hardware-in-the-loop simulator or a rapid control prototyping simulator, wherein a software model of a technical system is executed on the test device and the software model communicates electronically via an input/output interface of the test device with a system to be tested that is connected to the test device. Simulation data is electronically transmitted by the communication, and the configuration system is coupled to a modeling system and in the modeling system is a software model characterized by transversely and longitudinally connected function blocks. The configuration system configures the test device by interconnected configuration items such (Continued)

that the configuration items determine the physical characteristics of the input/output interface and/or the connection of the input/output interface with the software model.

11 Claims, 7 Drawing Sheets

(56) References Cited

U.S. PATENT DOCUMENTS

| | | | |
|---|---|---|---|
| 9,250,894 B2* | 2/2016 | von Hanxleden | G06F 8/70 |
| 10,054,920 B2* | 8/2018 | Oswald | G05B 17/02 |
| 10,095,194 B2 | 10/2018 | Tegethoff et al. | |
| 2012/0030646 A1* | 2/2012 | Ravindran | G06F 8/34 |
| | | | 717/105 |
| 2014/0101347 A1* | 4/2014 | Chandhoke | G06F 13/404 |
| | | | 710/26 |
| 2017/0045418 A1* | 2/2017 | Peperhowe | G06F 30/20 |

* cited by examiner

METHOD OF CONFIGURING A TEST DEVICE DESIGNED TO TEST AN ELECTRONIC CONTROL UNIT, AND A CONFIGURATION SYSTEM

This nonprovisional application is a division of U.S. application Ser. No. 16/119,718 which was filed on Aug. 31, 2018 which claims priority under 35 U.S.C. § 119(a) to German Patent Application No. DE 10 2017 120 016.9, which was filed in Germany on Aug. 31, 2017, and which are both herein incorporated by reference.

BACKGROUND OF THE INVENTION

Field of the Invention

The present invention relates to the development of control units, as are used e.g., in the automotive industry or in the aerospace industry for the control of technical systems, such as motors or brakes. In particular, the present invention relates to test devices used in the development process of the control unit.

Description of the Background Art

The development of control units has become a highly complex process. Thus, new control units or new control functions should be tested as early as possible in the development process to check general functionality and to specify the further direction of development. Towards the end of the development process, it is important to test the already well-developed control unit as comprehensively as possible in order to make necessary modifications based on the test results before the control unit is in use or enters series production so it works as desired under all circumstances in later operation.

For the testing of control units, the methods hardware-in-the-loop simulation (HIL simulation) and rapid control prototyping (RCP) are known. In HIL simulation, an electronic control unit is connected to a test device (HIL simulator), on which, for example, a software model of the system to be controlled or regulated by the control unit is executed. The software model is also referred to as the environmental model. The test device thus simulates the physical environment of the future operation for the control unit. In the RCP, on the other hand, a software model of a control unit to be developed or improved is executed on the test device. In the case of RCP, an external system connected to the test device is then regulated or controlled via the test device by means of the model executed on the test device.

The test of a (series) control unit used in the end product is the end point of a plurality of preliminary development steps of a regulation or control to be implemented on the control unit, wherein these development steps are usually described by the so-called V-model or V-cycle. At the beginning of the control unit development, which is essential for the functionality of many technical systems, the mathematical modeling of the control algorithm sits on a computer with a mathematical-graphic modeling environment, also called a modeling system, wherein the controller is to be regarded as part of the control unit. In addition, the environment of the control unit is mathematically modeled because the interaction between the controller on the control unit and the process to be controlled is of interest. In these functional mathematical considerations, a simulation in real time is usually not necessary (offline simulation).

In the next step, the previously designed control algorithm is transferred by means of the rapid control prototyping to a powerful, usually real-time capable hardware, which is connected via suitable I/O interfaces to the actual physical process, for example, a motor vehicle engine. As a rule, this real-time capable hardware has nothing to do with the subsequently used series control unit; it is a question of proving the basic functionality of the previously designed control in practice.

In a further step, as part of the automatic production code generation, the control is implemented on the target processor which is probably later actually used in the series control unit. The target hardware thus approximates the series control unit in this step, but is not identical to the series control unit.

In a further step, the series control unit, which is usually not available until a later stage of development, is checked by means of a hardware-in-the-loop (HIL) test. The (series) control unit physically present in this step is connected here by means of its physical control unit interface to a powerful simulation computer, often referred to simply as a simulator or test device. The simulator simulates the required variables of the real control unit to be tested and exchanges input and output variables with the control unit. The pins of the physical control unit interface of the control unit are connected with the simulator via a cable harness. Thus, it is possible in the simulation environment to simulate all the required variables, for example, of a motor vehicle engine—if needed, of the entire motor vehicle with engine, powertrain, chassis and driving distance—and to safely check the behavior of the control unit in interaction with the simulation environment.

For configurating test devices such as HIL or RCP systems, often configuration systems are used which may include, for example, configuration diagrams. The configuration adjusts the test device such that software models of technical systems can be executed on the test device and communicate electronically via the input/output interface of the test device with devices (systems to be tested) connected to the test device. Software models are created in dedicated modeling environments that are tailored to the needs of the modeling.

The known configuration systems or configuration diagrams have the disadvantage that the configuration of the test device properties in certain application scenarios is time-consuming, unclear and complicated.

In particular, it is a disadvantage that the configuration systems have a very large number of configuration items, arranged in a different structure than it is known from the modeling environment, resulting in a non-intuitive and slow configuration.

SUMMARY OF THE INVENTION

It is therefore an object of the present invention to further develop the configuration process of HIL and RCP simulations and, in particular, to simplify, to make it more flexible, to make it more intuitive and to accelerate it.

In an exemplary embodiment, an object is achieved by a configuration system for a test device designed for testing an electronic control unit, wherein the test device is a hardware-in-the-loop simulator or rapid control prototyping simulator, wherein a software model of a technical system is executed on the test device and the software model communicates via an input/output interface of the test device with a system to be tested that is connected to the test device, wherein the communication electronically transmits simulation data, and the configuration system is coupled to a modeling system and in the modeling system is a software model characterized by function blocks interconnected transversely and longitudinally, and the configuration system configures the test device by means of interconnected configuration items such that the configuration items specify the physical properties of the input/output interface and/or the connection of the input/output interface with the software model, and the configuration system has a coupling interface for coupling to the modeling system, wherein by means of the coupling, the software model is made available to the configuration system during runtime of the modeling system, characterized in that the configuration system analyzes the model and thereby determines a model structure, wherein the model structure at least describes to which other blocks each block is longitudinally connected, the configuration system initiates a transfer of the model structure to the configuration system, and in the configuration system, the configuration items are structured according to the transmitted model structure such that for the first function block and thus a longitudinally subordinate or superior second function block, a respective first and second configuration item associated thereto are generated, which are longitudinally interconnected.

Such a configuration system according to the invention offers many technical advantages.

By also considering the model structure in the configuration system, a complete model topology with all its associated input-output interfaces is presented outside the modeling environment, allowing for the model-oriented insertion, deletion, movement, and swapping of input/output functions. Signal chains, i.e., the connections between function blocks and input/output access points or so-called model port blocks, can now be generated independently of the modeling environment. The invention further allows for the signal chain to be attached directly to a given model level and generated there. This results overall in a clearer and less complicated configuration as compared to the configuration methods of the prior art.

Here, transversely connected means that the function blocks are connected according to the signal flow. A signal is thus sent between two mutually transversely connected blocks. Longitudinal connections arise, for example, if several transversely connected function blocks are combined to form a comprehensive function block or subsystem. This results in two partial models or model diagrams that are connected to each other longitudinally.

Function blocks and configuration items associated with one another are those which lie on the same longitudinal plane and lie, in other words, on the same hierarchical level.

The transfer of the model structure can be done, for example, by suitable automation interfaces.

The model structure may be, for example, a data structure in which the designations of the components of the model and their hierarchical order as well as possibly further parameters and descriptions are stored.

The term electronic transfer or electronic communication can cover all possibilities of digital and analog electronic data transfer, such as via cables, electrical conductors, conductor tracks, radio waves or any other form of wireless transfer by electromagnetic waves, optical or opto-electronic transfer via fiber optic cables, the use of networks and bus systems as well as the transfer of bits and bytes, e.g., in a computer system and the like.

The configuration item accesses the modeling system in the configuration system, and the access generates an IO access point as a new function block in the modeling system, wherein the longitudinal plane of the IO access point corresponds to the longitudinal plane of the configuration item from which access was initiated.

Access can be initiated e.g., by a keyboard or mouse command. In particular, access can be initiated by dragging an input-output function or a graphical representation of a channel of the test device with the mouse onto a configuration item. If access is initiated by pulling a channel, a selection of an appropriate input-output function subsequently takes place.

The term IO access point can be synonymous to the expression input/output access point or model port block. An IO access point represents the connection between the model to be executed and the input-output interface of the test device.

This allows for the configuration to take place completely in the configuration system and no longer has to be switched between the configuration system and the modeling system, as is common in the prior art. This also prevents unwanted editing from taking place in the model.

Thus, by way of the access, a signal chain formed of an input-output function and/or a channel of the test device can be automatically assigned to a model. If multiple models are active in the modeling environment at the same time, then an automatic selection of a model suitable for the input-output function or the channel of the test device can take place. The selection is made based on hardware or topology information associated with the input-output function or the channel of the test device. Thus, the model that runs in an application process which can access the selected input-output interface or hardware is chosen. This is very advantageous especially in multiprocessor applications.

The configuration system can be designed such that a change to a configuration item in the configuration system is automatically transferred to the function block associated therewith in the modeling system. This has the advantage that a configuration step is omitted for the user since the change in the modeling system no longer has to be made manually.

This is advantageously done only if a change is relevant to the respective IO access point, which is ascertained by the configuration system. If there are changes to the ports (inputs and outputs) of the input-output functions, especially when assigning the input-output function to the associated IO access point, then these changes in the functions are automatically propagated into the modeling environment.

The transfer of the changes can also take place selectively within the scope of the invention. This means that changes are transferred in a selected model, block, or subsystem.

The configuration system can also be designed such that it can modify the modeling system in such a way that a change to a function block in the modeling system is automatically transferred to the configuration item in the configuration system associated therewith. The transfer of the change can optionally take place after initiation by a user.

The configuration system can further include a configuration item for displaying components of the input/output interface that are not configured to communicate with the software model. This means, in particular, that those input-output functions are displayed that are not associated with a model from a modeling environment. The configuration item for displaying components of the input/output interface that are not configured to communicate with the software model can still be used for resolving signal chains or connections. This means that, for example, input/output functions can be moved to this configuration item. This releases the input/output function from the model (the signal chain is resolved). However, the input/output function and the model port block are retained. This was not possible in previous configuration systems.

It is also possible to remove complete signal chains, thereby also deleting them from the modeling system.

The configuration system may be further configured to include a marking system, wherein the marking system is designed to mark configuration items having inconsistencies with the respective associated function blocks. An inconsistency is, e.g., the case that a configuration item, in particular an input-output function, is not assigned to any IO access point. Within the framework of this development stage, the configuration system can also have a notification system which informs a user that a propagation or transfer of the changes is necessary because, for example, certain parameters have been changed. The markings can be done, for example, by color highlighting, e.g., if the interfaces between the model port block and the input/output function have inconsistencies with regard to the number of ports, port widths or port data types. For example, the markers may also be done as a pictogram in the style of an update arrow on the model port block if, for example, the model port block has been changed in the configuration system but the change has not yet been transferred to the modeling system.

In a further expansion stage, in the configuration system, the configuration items can be structured in a special execution mode corresponding to the transferred model structure, in which it is not possible to adjust an entire port configuration. This allows users to focus on a subsegment of the configuration. In this case, complete port configuration refers to the assignment of all IO access points to input-output functions.

The configuration system can configure an input/output event by means of the configuration item and transmit the configured event to the modeling system. Here, e.g., task configurations are automatically generated or existing task configurations are assigned to the event.

A task is a part of a program code whose execution is controlled by a real-time operating system. A task is usually triggered or initiated by one or more events. In a configuration system according to the invention, various predefined tasks can be created. It is also possible to re-create application-specific tasks, e.g., input/output events. Input/output events are asynchronous events that are triggered asynchronously by an input/output function. Depending on the type of task, various parameters such as priority or a data acquisition raster name (DAQ raster name) can be configured.

The configuration system may also be configured to allow access from the modeling system to the configuration system through the coupling. Through this access, for example, the configuration system can be activated and a switch to the configuration item or input-output function associated with the respective access point can be made. An initial data input or adjustment or a project creation can also be generated by the modeling system. Furthermore, this access can initiate a deletion of the signal chain and functionalities of the configuration system, such as the generation of an executable application process, can be made available in the modeling system. In addition, the IO function associated with an access point and/or the assignment of the access point to the input/output hardware of the test device can be indicated in the modeling system. This allows a user to see in the modeling environment, which channels of the input/output interface are associated with the access points. This facilitates the connection of external devices to the test device or the control of the test device cabling with the external devices. In a further embodiment, the assignment of the individual terminals (pins) can also be transferred to the modeling environment, which makes the so-called "buzzing out" easier when connecting the external devices, for example, the ECUs to be tested. A special feature of the access from the modeling system to the configuration system is also that the information displayed in the modeling system is not included in the model, only in the configuration system.

A method is also included for configuring a test device designed for testing an electronic control unit by means of a configuration system, wherein the test device is a hardware-in-the-loop simulator or rapid control prototyping simulator, wherein a software model of a technical system is executed on the test device and the software model communicates with a system connected to the test device via an input/output interface of the test device, simulation data being transmitted electronically by the communication, wherein the configuration system is coupled to a modeling system and in the modeling system there is a software model characterized by transversely and longitudinally connected function blocks, and the test device is configured by the configuration system by means of interconnected configuration items such that the physical properties of the input/output interface and/or the connection of the input/output interface with the software model are defined by means of the configuration items, wherein the configuration system is coupled to the modeling system such that during runtime of the modeling system, the software model is made available in the configuration system by means of a coupling interface, characterized in that the configuration system analyzes the model and thus determines a model structure, wherein the model structure describes with which other blocks each block is longitudinally connected, the configuration system initiates a transfer of the model structure to the configuration system and in the configuration system, the configuration items corresponding to the transmitted model structure are structured in such a way that for the first function block and thus a longitudinally subordinate or superior second function block, a respective first and second configuration item associated thereto are generated, which are longitudinally interconnected.

The modifications, other properties and effects described above with respect to the configuration system of a test device designed for testing an electronic control unit are analogously applicable to the said method. In particular, there are now a large number of possibilities for designing and developing the method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
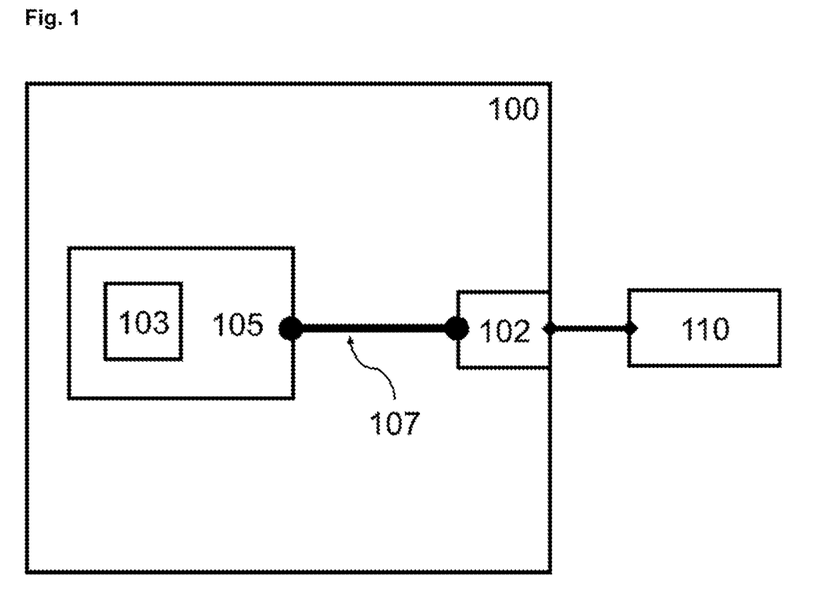
FIG. 1 is a schematic representation of a test device.

FIG. 1 shows a test device 100 on which a software model 103 of a technical system is executed on a calculation unit 105, wherein the software model or the calculation unit communicates via an input/output interface 102 of the test device, and an internal data connection 107 communicates with a device 110 connected to the test device. A calculation unit may be, e.g., a processor, an FPGA or an embedded PC. The communication with the test device can take place via the transmission of analog or digital electrical signals. The test device may include various hardware units (e.g., riser cards) that form the input/output interface 102. The input-output interface and the calculation unit 105 form a coherent system, but can also be spatially separated from each other and connected to each other via electronic connections.

For example, the test device 100 may be a hardware-in-the-loop (HIL) simulator. The test device 100 may also be a "Rapid Control Prototyping" (RCP) system. The test device can also be a device that is suitable for performing HIL tests or RCP tests in that a model of a technical system can be executed in the test device and this model can exchange data via input/output interfaces with a device, such as a control unit, which is connected to the test device, wherein with this data exchange, in particular the reaction of the test device to the resulting model data, which is transmitted for example in the form of electrical signals to the control unit, is analyzed.

A software model 103, such as a model of a technical system, may for example be available in the form of a software model, which is specified by a source code, for example in a high-level language such as C, C++, or in a machine language such as Assembler or an executable machine code. Using a technical model, any system can be modeled to virtually simulate it. Thus, for example, a model of a motor may be available as software, wherein the software is programmed such that during a simulation, in this case an execution of the model on a CPU or an FPGA, input parameters are processed by the software and depending on the input parameters and the properties of the model, output values are generated. An input parameter may be, for example, a voltage applied to a throttle valve of a gasoline engine and output values could in this regard be a resulting throttle valve opening angle, fuel consumption and/or a torque resulting at the crankshaft. However, the model may also be a model of a control unit to be tested or developed. In general, the software model can be understood as an algorithm for controlling, regulating or simulating the behavior of a technical system.

Figure 2A:
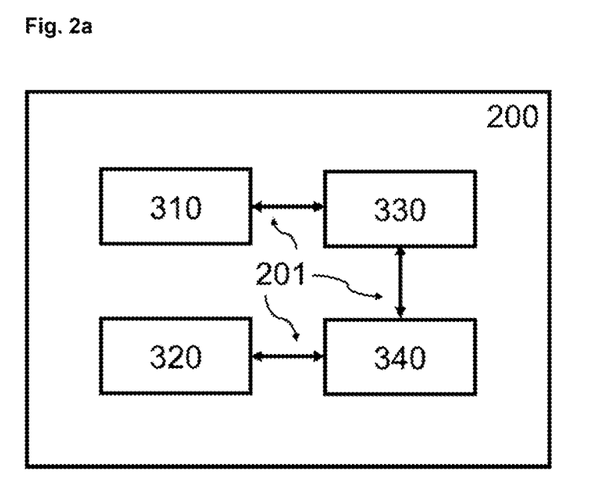
FIGS. 2a and 2b illustrate two schematic representations of configuration systems.

FIG. 2a schematically illustrates a configuration system 200 or a configuration diagram which contains a plurality of configuration items (310, 320, 330, 340) which can be connected to connection lines 201 for configuring the test device 100.

For example, properties and functionalities of the test device, in particular the input/output interfaces and/or the model interfaces or internal data connections 107, can be configured with the configuration items. Exemplary properties include interface types, voltage/current ranges, units, unit scales, data types, duty cycles, frequencies and/or error injections. These properties can be specified by parameters, for example by predetermined selection options from several parameters or by an option for free input of the parameters. These properties can be transmitted to the test device by means of the configuration system, where they can be stored and thus cause a configuration of the test device according to the characteristics. This configuration process can also be done indirectly, e.g., by code generation according to the characteristics, and/or subsequent compilation of the generated code, transfer of the code or the compiled code to the test device, and execution of the compiled code on the test device. The storage of the properties on the test device can therefore also take place by means of a source code or binary code.

The configuration items can be assigned physical properties of the test device with respective parameters of the properties and by means of the parameters, the communication, in particular the functionality between the connected device (system to be tested) and the software model, can be configured. In a graphical configuration environment, the individual configuration items can also be interconnected to perform a configuration of the test device. With the connection lines 201, various configuration items can be interconnected, in other words, associated or assigned. These assignments allow for various hardware components of the test device, such as processors, FPGAs, input/output boards, storage media, and the like, to be configured to exchange data, that is, to receive and transmit electrical signals.

Figure 2B:
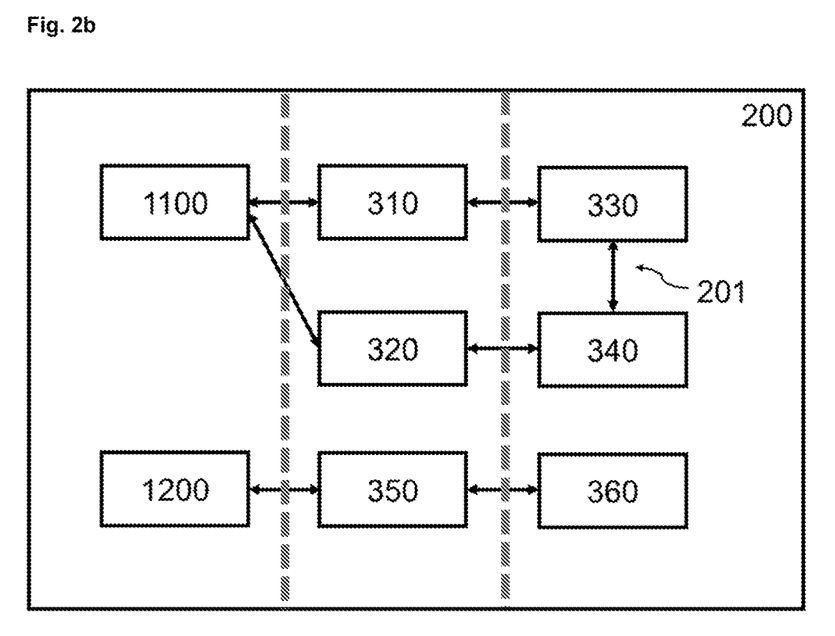

FIG. 2b illustrates a more specific form of a configuration system 200. Here, the configuration system is divided into 3 subunits or columns, making the configuration much more efficient and intuitive for a user. In the embodiment illustrated here, in the left-hand column, the devices connected to the test device 100 are configured with the configuration items 1100 and 1200. The input/output interface of the test device is configured with the configuration items 310, 320, and 350 provided in the middle column. The properties of the models connected to the devices to be tested are configured with the configuration items 330, 340 and 360 in the right-hand column. The configuration items may be graphically connected to one or more other configuration items to set the transmission paths of physical or logical signals.

A configuration system differs from a modeling environment in that it is specifically tailored to the requirements for configuring a test device. In particular, it is thus also possible to create a documentation of the test device, to reuse configuration components or software models in different test scenarios, to execute software models from different development/modeling environments on the test device, to optimize multi-core and multi-processor uses.

Figure 3:
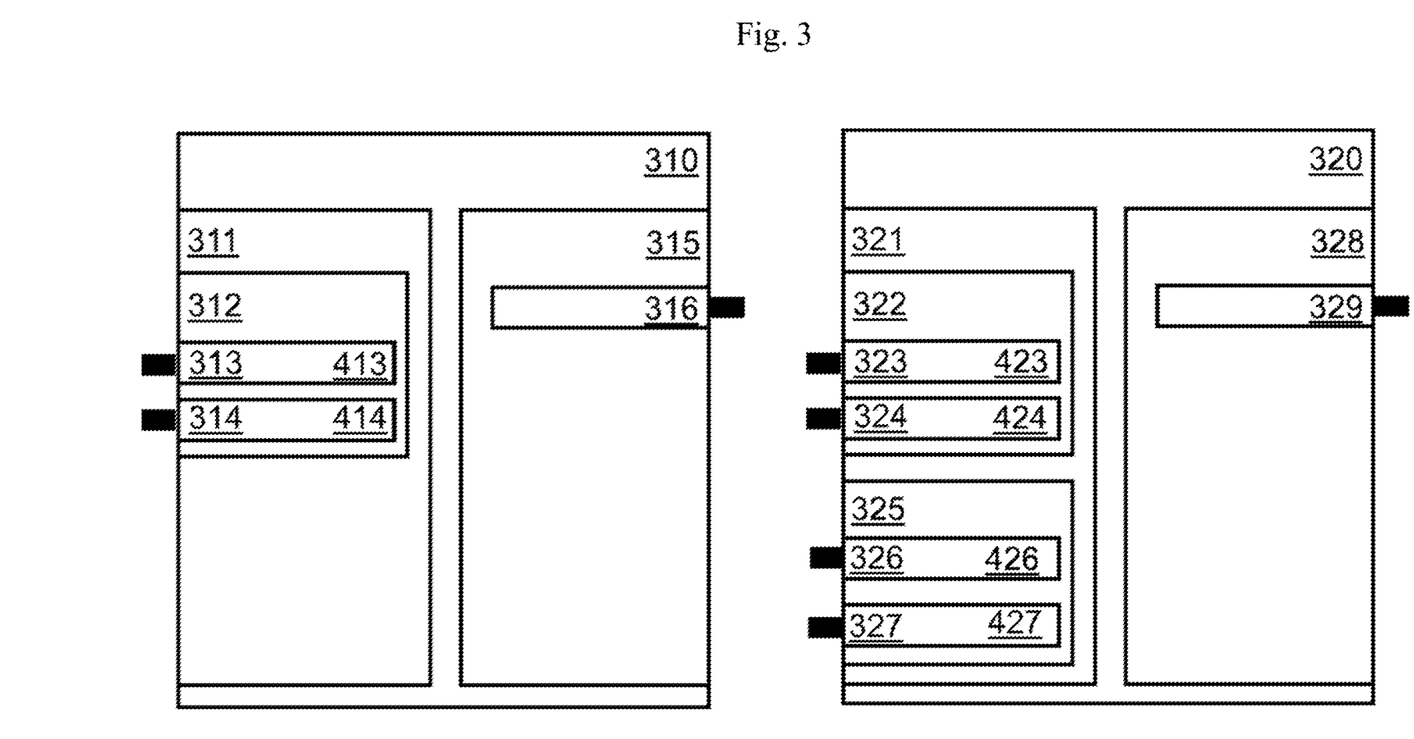
FIG. 3 is a schematic representation of configuration items.

FIG. 3 shows special types of the configuration items 310 and 320 in which the configuration items have a hierarchical structure. The various hierarchical levels (311, 312, 313, 314, 315, 316) of the configuration item can in turn be understood as configuration items (311, 312, 313, 314, 315, 316). The configuration items are each a specific item type. An item type or the role of an item in terms of this invention is understood to be a technical typification of an item. Exemplary item types include input/output devices, input/output channels, input/output cards, routers, potentials, slot pins, function ports, function blocks, signal conditioning and/or logic signals. In the concrete example in FIG. 3, the configuration item 310 that is set to the highest hierarchical level can be, for example, of the type "input-output function" or "IO-function", "function block" or more specifically "voltage in/out", "current in/out", "analog/digital in/out" or "PWM in/out". The configuration items 311 and 315 of the next lower hierarchical level may, for example, be of the type "electrical interface" or "model interface". The configuration items 312 of the next lower hierarchy level may be, for example, of the type "logic signal". The configuration items of the lowest hierarchy level may, for example, be of the type "function port", "signal port" or "model port" and may also generally be referred to as a port. In a hierarchical structure of the configuration items, it may also be the case that a property is additionally associated with the configuration items that are hierarchically superior and/or subordinate to the configuration item that is primarily associated with the respective property.

The configuration items can be assigned properties of the test device at all hierarchical levels. In the exemplary embodiment illustrated here, the configuration items 313 and 314 are assigned the properties 413 and 414. Since the configuration items 313 and 314 are hierarchically subordinate to the configuration item 310, the properties 413 and 414 can likewise be assigned to the configuration item 310 and/or assigned to the configuration items positioned between the configuration items 310 and 314.

Accordingly, in this embodiment, the configuration items 323, 324, 326 and 327, which are hierarchically subordinate to the configuration item 320, are assigned the properties 423, 424, 426 and 427. Since configuration items 323, 324, 326, and 327 are hierarchically subordinate to configuration item 320, properties 423, 424, 426, and 427 may also be assigned to configuration item 320 and/or assigned to the configuration items positioned between configuration items 320 and 323, 324, 326 or 327, respectively.

The properties can be physically stored in the test device, e.g., as data structures, file structures, function structures, program structures, variables, parameters or the like.

The configuration items at the lowest hierarchical level (e.g., 313 and 314) may also be referred to as ports. These can be connected to ports of other configuration items so as to enable data exchange or communication or signal exchange between the connected configuration items or the hardware units associated therewith. This connection can also take place automatically taking into account the properties and/or roles.

A configuration item can, for example, also be a graphic element (block, UML node, etc.) in a graphical user interface, such as a configuration diagram. A configuration item can also be a smaller part of a larger graphical element in a graphical user interface.

Figure 4:
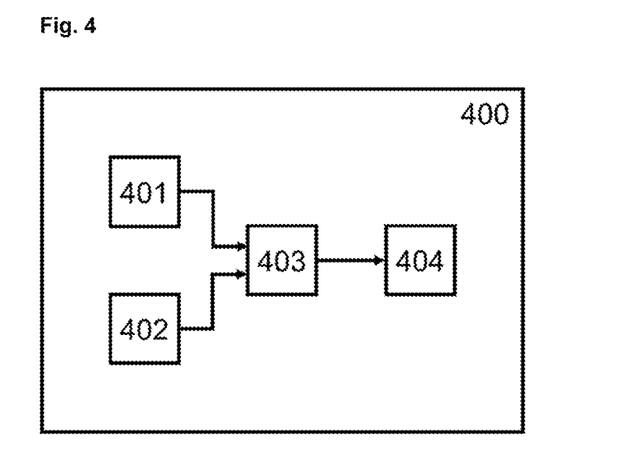
FIG. 4 is an exemplary modeling environment.

FIG. 4 shows an exemplary modeling environment 400 in which a (graphical) program or an optional algorithm is graphically modeled. Here, program or model components and their functional relationships are configured by graphical elements, such as blocks and lines. For example, the graphical program 400 in FIG. 4 designed in the modeling environment may be designed such that said graphical program reads in a first input value with the function block 401 and a second input value with the function block 402, then further processes the read-in data in accordance with the functionality specified in block 403 in order to output an output value by means of the output block 404, which is calculated by means of the graphical program. The functionality of block 403 could be, for example, to add or multiply the input values, to differentiate or integrate them, or the like. The graphical blocks can be interconnected by connecting lines, thus establishing a data exchange between blocks. Of course, a graphical program 400 is not limited to the embodiment shown here but may be more complex, which may be reflected in the number of blocks and block connections. The graphical program 400 may be used to model a technical system. Thus, a graphical program 400 may also be a model of a technical system 103 and/or 104. The programming of models of technical systems is often done with graphical programming languages where graphic blocks are linked together in a block diagram. Each graphic block is assigned a specific functionality. These can be simple mathematical operations. On the other hand, the functionalities of graphical blocks can also be far more complex and represent complete program functions or programs. An example of such graphical programming languages or modeling environments is, for example, Simulink by The Mathworks. In some circumstances, for example if the function blocks are also suitable for configuring a test device, the function blocks can also be referred to as configuration items.

Figure 5:
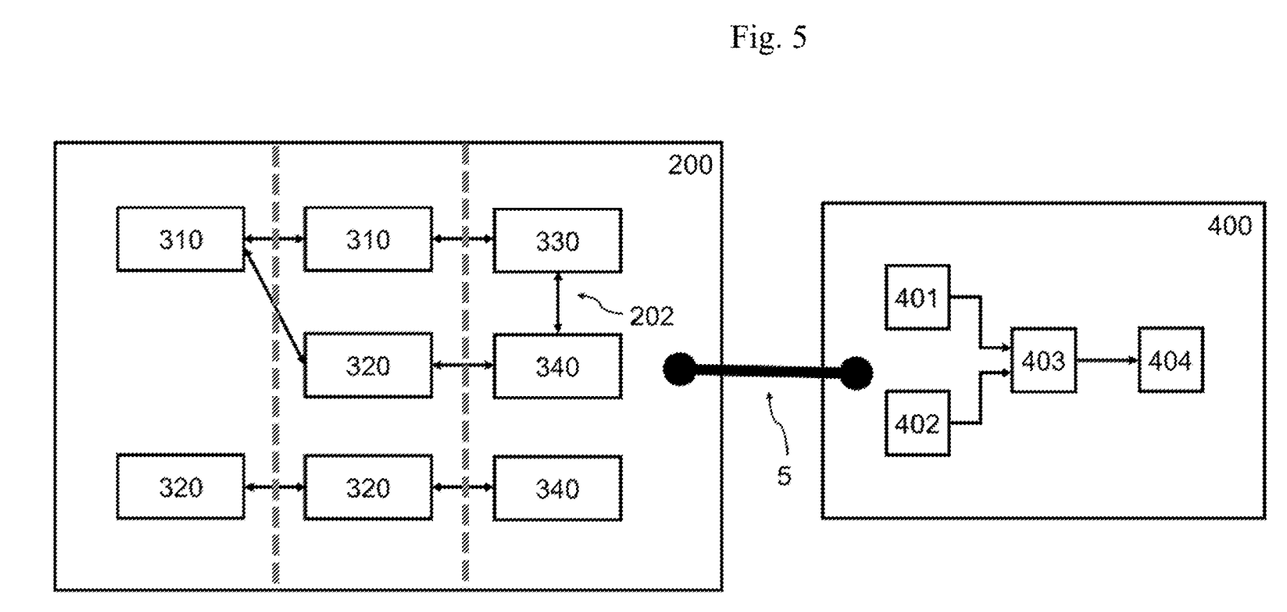
FIG. 5 is an exemplary form of a configuration system which is connected with a modeling environment via a coupling interface.

FIG. 5 shows an exemplary form of a configuration system 200 that is connected to a modeling environment 400 via a coupling interface 5. Via the coupling interface, information about the software model is transferred to the configuration environment.

If a transfer from the configuration system is initiated, the configuration system can use the coupling interface to recognize which software models are currently in the modeling environment or are being processed. Of these software models, one or more may be selected, for example, via a list view in the configuration system, to provide it to the configuration environment without having to manually specify a file path to the software model. In this case, the software model can also be analyzed, for example, to determine its subsystem structure and/or model port blocks or input/output interfaces of the software model, and to use it in the configuration system. Software models are recognized via proprietary connection mechanisms or general automation interfaces. Via these, software commands can be issued to query open software models or file paths. The necessary commands can be encapsulated within the configuration system.

If the transfer from the modeling environment is initiated, then the configuration system can be started from the modeling environment, if necessary. From an open software model, a user may initiate the addition of the software model to an existing instance of the configuration system or the creation of a new instance to which the software model is added. In order to make this possible, source code components are inserted in the process space of the modeling environment, with which, for example, automation interfaces of the configuration system can be accessed. This way, for example, the name and/or the file path or other properties of the software model can be transferred.

Figure 6:
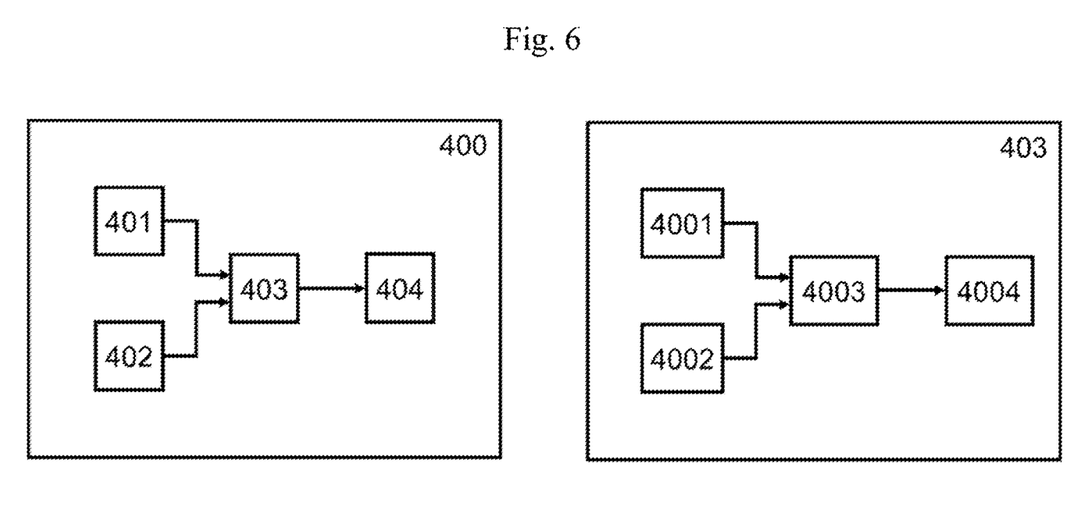
FIG. 6 is a modeling system which has transversely and longitudinally interconnected function blocks.

FIG. 6 illustrates a modeling system having transversal and longitudinally linked function blocks. In other words, the diagram 403 represents a subsystem. In order to manage the complexity of models having many function blocks, it is possible for a plurality of function blocks to be combined or grouped to form a new function block, which is then referred to as a subsystem. In this exemplary embodiment, the function blocks 4001-4004 have been combined to form the subsystem 403. Therefore, instead of being represented by 4 blocks in the model 400, these 4 function blocks 4001-4004 are represented by only one function block, i.e., subsystem block 403. This makes the model 400 visibly clearer. Since the function blocks 401 to 404 can also be combined to form a common subsystem block, the model 400 can also be called a function block. Thus, in this exemplary embodiment, the models or subsystems or function blocks 400 and 403 are longitudinally interconnected. In contrast, the function blocks 401 to 404 are connected to each other transversely. The function blocks 4001 to 4004 are also connected to each other transversely. The function block 400 is longitudinally subordinate to the function block 403.

In other words, the blocks 4001-4004 are indirectly longitudinally connected to the function blocks 401, 402 and 404 via the subsystem formation.

Figure 7:
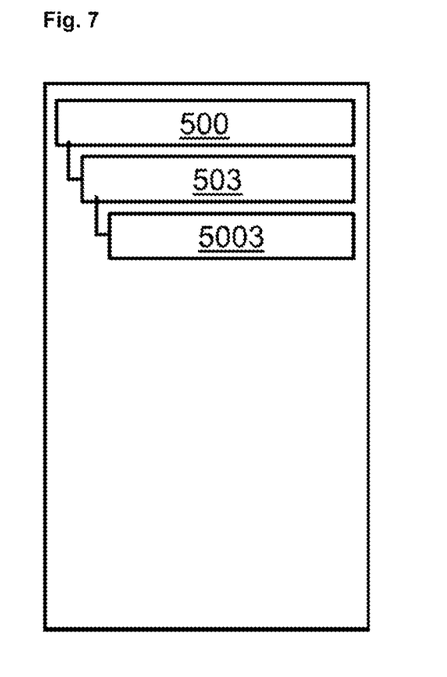
FIG. 7 is a part of a configuration system with longitudinally connected configuration items.

FIG. 7 shows a part of a configuration system in which the configuration items 500, 503 and 5003 are structured according to the transferred model structure in such a way, that for the function block 403 and the thus longitudinally subordinate and superordinate function blocks 400 and 4003 in each case the configuration items 503, 500 and 5003 associated thereto were created, which were interconnected longitudinally. The longitudinal connection is shown here also by the hierarchical arrangement.

Here, a configuration item 5003 also associated with the function block 4003 is shown, since the function block 4003 also represents a subsystem and includes other function blocks which, however, are not illustrated in FIG. 7. Another configuration item that is associated with an input/output function may be subordinate to the configuration item 5003.

According to the invention, the longitudinal representation in FIG. 7 can also be converted into a transversal representation. This allows for the configuration items to be edited and displayed in different views without having to leave the configuration system.

It is also furthermore possible that a configuration item is subordinate to several configuration items.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A configuration system comprising:
a test device having at least a processor, the test device designed for testing an electronic control unit, the test device being a hardware-in-the-loop simulator or a rapid control prototyping simulator, a software model of a technical system is executed on the test device and the software model electronically communicates via an input/output interface of the test device with a system to be tested that is connected to the test device, wherein simulation data is transmitted electronically by the communication; and
a modeling system having a software model comprising transversely and longitudinally connected function blocks, the configuration system configures the test device through interconnected configuration items such that the configuration items determine a physical characteristics of the input/output interface and/or the connection of the input/output interface to the software model, and the configuration system has a coupling interface for coupling to the modeling system,
wherein the software model is made available to the configuration system during runtime of the modeling system via the coupling,
wherein the configuration system analyzes the software model and thus determines a model structure of the software model,
wherein the model structure of the software model at least describes to which other blocks each block is longitudinally connected,
wherein the configuration system initiates a transfer of the model structure of the software model to the configuration system, and
wherein the configuration items are structured corresponding to the transferred model structure of the software model such that for the first function block and thus a second, longitudinally subordinate or superordinate function block, a first and second configuration item each associated thereto are generated, which are longitudinally interconnected.

2. The configuration system according to claim 1, wherein the configuration item accesses the modeling system, and the access generates an IO access point as a new function block in the modeling system, and wherein the longitudinal plane of the IO access point corresponds to the longitudinal plane of the configuration item from which the access was initiated.

3. The configuration system according to claim 2, wherein configuration parameters of the generated IO access point in the modeling system are automatically adjusted by the configuration system.

4. The configuration system according to claim 1, wherein a change to a configuration item in the configuration system is automatically transferred to the function block associated thereto in the modeling system.

5. The configuration system according to claim 1, wherein a change to a function block is automatically transferred to the confirmation item associated thereto.

6. The configuration system according to claim 1, further comprising a configuration item for displaying components of the input/output interface that are not configured to communicate with the software model.

7. The configuration system according to claim 1, further comprising a marking system, wherein the marking system is designed to mark configuration items having inconsistencies with the respective associated function blocks.

8. The configuration system according to claim 1, wherein the configuration items are structured according to the transferred model structure in a special execution mode, in which it is not possible to adjust an entire port configuration.

9. The configuration system according to claim 1, wherein an input/output event is configured by the configuration item and is transferred to the modeling system.

10. The configuration system according to claim 1, wherein the coupling provides access from the modeling system to the configuration system.

11. A method for configuring a test device designed to test an electronic control unit, wherein the test device is a hardware-in-the-loop simulator or a rapid control prototyping simulator, the method comprising:
executing a software model of a technical system on the test device and the software model communicates electronically via an input/output interface of the test device with a system to be tested that is connected to the test device,
transmitting simulation data electronically by the communication;
coupling the configuration system to a modeling system, wherein, in the modeling system, is a software model having transversely and longitudinally interconnected function blocks;
configuring the test device via the configuration system by interconnected configuration items such that the physical properties of the input/output interface and/or the connection of the input/output interface with the software model are determined via the configuration items, wherein the configuration system is coupled to the modeling system such that the software model is made available to the configuration system during runtime of the modeling system via a coupling interface;

analyzing, by the configuration system, the software model and thus determining a model structure of the software model that describes to which other blocks each block is connected longitudinally;

initiating a transfer by the configuration system of the model structure of the software model to the configuration system; and structuring, in the configuration system, the configuration items corresponding to the transferred model structure of the software model such that for the first function block and thus a longitudinally subordinate or superordinate second function block, a first and second configuration item are generated, which are longitudinally interconnected and each associated to said function blocks.

\* \* \* \* \*